United States Patent
Saito et al.

[15] 3,654,420
[45] Apr. 4, 1972

[54] APPARATUS FOR SHAPING A WORKPIECE BY ELECTRICAL DISCHARGE WITH DETECTION MEANS FOR STOPPING THE SHAPING OPERATION UNDER ABNORMAL CONDITIONS

[72] Inventors: Nagao Saito; Yoichi Kuji; Sinji Arai, all of Nagoya, Japan

[73] Assignee: Mitsubishi Electric Corporation, Tokyo, Japan

[22] Filed: Aug. 14, 1970

[21] Appl. No.: 63,760

[52] U.S. Cl. ..........................................219/69 S, 219/69 G
[51] Int. Cl. .......................................B23p 1/08, B23p 1/14
[58] Field of Search......................219/69 C, 69 G, 69 P, 69 S

[56] References Cited

UNITED STATES PATENTS 3,439,146  4/1969  Ullmann et al..........................219/69 G

*Primary Examiner*—R. F. Staubly
*Attorney*—Oblon, Fisher & Spivak

[57] ABSTRACT

An apparatus for shaping a workpiece by electrical discharge in a gap between the workpiece and a shaping electrode. An oil pressure servo-mechanism is used to maintain the gap at a constant value. The shaping process takes place within a tank filled with an inflammable liquid. Under abnormal conditions, an undesirable deposit, such as carbon, may form and build up on the workpiece surface and thereby cause the electrode to move away from the workpiece during a shaping process instead of closer thereto. Means, such as a mechanical switching arrangement or electrical circuitry, are provided for detecting time delay the abnormal condition and for enabling the shaping operation to thereby be stopped.

7 Claims, 7 Drawing Figures

PHASE INVERSION
CHARACTERISTICS OF
OPERATIONAL AMPLIFIERS 27, 28, 29

INVENTORS
NAGAO SAITO
YOICHI KUJI
SINJI ARAI

BY *Oblon, Fisher & Spivak*

ATTORNEYS

3,654,420

APPARATUS FOR SHAPING A WORKPIECE BY ELECTRICAL DISCHARGE WITH DETECTION MEANS FOR STOPPING THE SHAPING OPERATION UNDER ABNORMAL CONDITIONS

BACKGROUND OF THE INVENTION

Field Of The Invention

This invention generally relates to an apparatus for shaping a workpiece by electrical discharge in accordance with the shape of an electrode and more particularly to an apparatus for shaping a workpiece by providing an arc discharge within the gap between the workpiece and the electrode which apparatus is characterized with the provision for automatically detecting an abnormal shaping condition, such, for example, as a condition wherein the electrode will move in a direction opposite to that of the shaping direction as a result of a deposit, such as carbon, being formed within the shaping gap.

Description Of The Prior Art

FIG. 1 shows the relative relationship which exists between an electrode 3 and a workpiece 2 in a typical apparatus for shaping by electrical discharge. A servo-mechanism (not shown) is generally employed for maintaining the working gap 4 between the electrode 3 and the workpiece 2 at a constant value. Thus, during shaping of the workpiece 2, the servo-mechanism will maintain the size of the gap 4 at a constant value as the electrode 3 moves in a direction, as shown by the arrow, towards the workpiece.

One of the problems which exists during the shaping of a workpiece is that sometimes the shaping liquid 5 which passes within the electrical discharge gap 5 either is unstable, has insufficient insulation recovery, or a powder is formed and retained within the gap such as to cause the electrical discharge to focus at a point on the electrode surface and result in a stationary arc condition. Under such adverse conditions, if, for example, kerosene is used as the shaping liquid, the same may become decomposed by the electrical discharge and a separate carbon buildup may be accumulated within the shaping gap 4. This condition is more clearly shown with reference to FIG. 2.

In FIG. 2, the accumulated deposit, such as carbon, is shown as G. In typical apparatus for shaping a workpiece by electrical discharge, the size of the gap 4 between the electrode 3 and the workpiece 2 is detected by measuring the average electrical discharge shaping voltage. Thus, under normal shaping conditions, the detected shaping voltage will enable a servo-mechanism to adjust the gap 4 between the electrode 3 and the surface of the workpiece 2 by moving the electrode 3 in a direction towards the workpiece 2 in accordance with the amount of surface removed from the workpiece.

Now, under the adverse conditions enumerated above, a deposit G may form and thereby cause the electrical discharge to occur between the deposit G and the electrode 3, instead of between the workpiece 2 and the electrode 3. As such, the average electrical discharge shaping voltage which is detected as corresponding to the gap will erroneously be the voltage between the electrode 3 and the deposit G. As a direct result thereof, the servo-mechanism will cause the electrode 3 to move in accordance with the erroneously detected shaping voltage in a direction away from the workpiece 2, the amount being dependent upon the size of the deposit G. If such a condition continues for a long period of time, the point of electrical discharge will come near the surface of the shaping liquid 5 and a fire may result therefrom. Obviously, the possibility of a fire is quite undesirable, both from a standpoint of safety and from a standpoint of shaping efficiency.

SUMMARY OF THE INVENTION

Accordingly, it is one object of this invention to provide a new and improved apparatus for detecting an abnormal condition during the shaping of a workpiece by electrical discharge.

A further object of this invention is to provide a new and improved unique apparatus for shaping a workpiece by electrical discharge between the workpiece and a shaping electrode which includes mechanical switching means for detecting an abnormal condition and for stopping the shaping process at such time.

Yet another object of the present invention is to provide a new and improved unique apparatus for shaping a workpiece by electrical discharge which includes means for detecting an abnormal condition through the use of electrical circuitry and for stopping the shaping process at such time.

One other object of this invention is the provision of a new and improved unique apparatus for enabling the operation of shaping a workpiece to be stopped with a high degree of reliability upon the detection of an abnormal condition whereby the possibility of fires may be eliminated and the shaping efficiency increased.

Briefly, in accordance with this invention, these and other objects are in one aspect attained in an electrical discharge shaping apparatus wherein the shaping occurs within a liquid by the provision of means for detecting movement of a given amount of the shaping electrode in a direction opposite to that of the shaping direction and for stopping the shaping operation if the detection continues after a predetermined time delay.

BRIEF DESCRIPTION OF THE DRAWINGS

A more complete appreciation of the invention will become readily apparent as the same becomes better understood by reference to the following detailed description when considered in connection with the accompanying drawings, wherein.

DETAILED DESCRIPTION OF THE PREFERRED EMBODIMENTS

Figure 3:
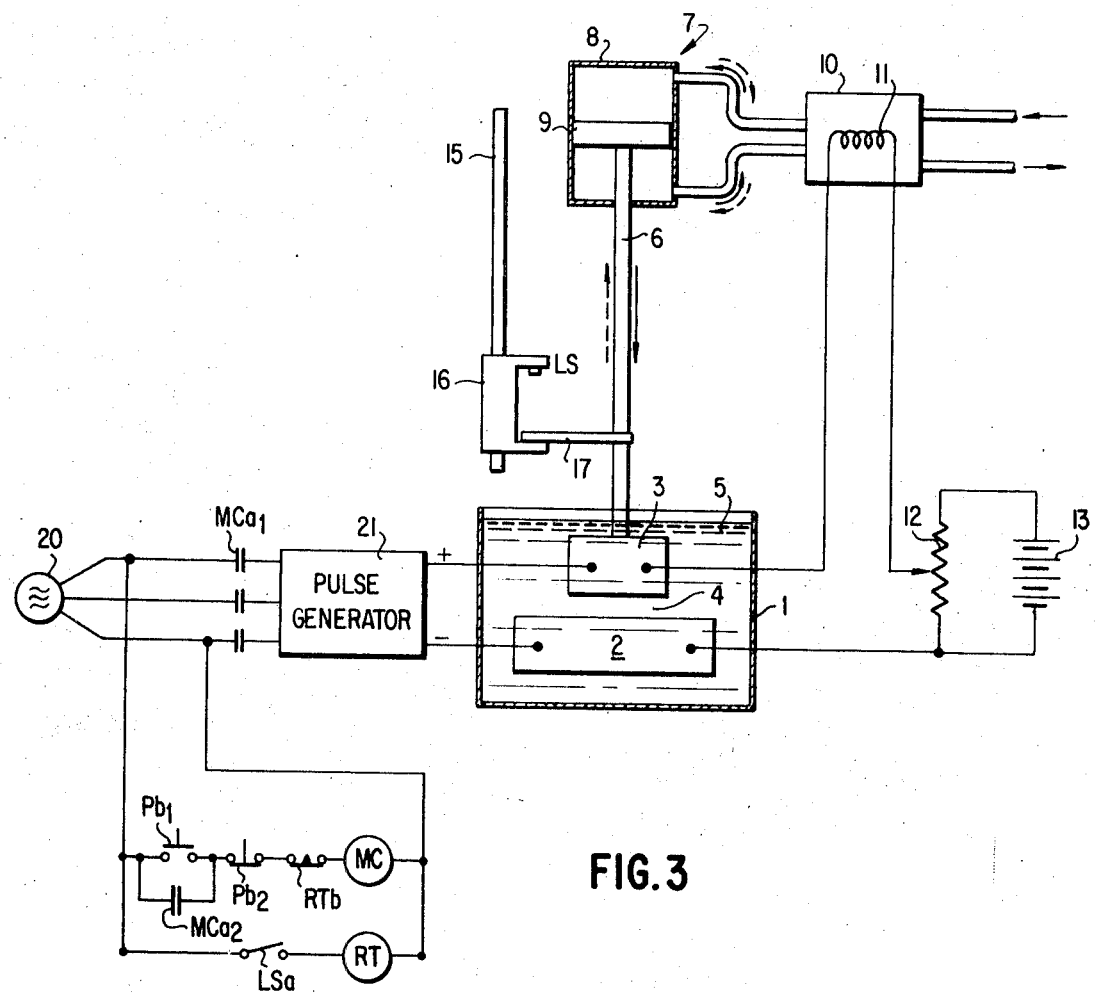
FIG. 3 shows a schematic block diagram of one preferred embodiment of the electrical discharge shaping apparatus in accordance with the present invention.

Referring now to the drawings, wherein like reference numerals designate identical, or corresponding parts throughout the several views, and more particularly to FIG. 3 thereof, wherein one embodiment of the present invention is shown as including a shaping tank 1, a workpiece 2 which is fixed within the tank 1 and a shaping electrode 3 for shaping the workpiece 2 through a working gap 4. A shaping liquid 5, such, for example, as kerosene, is provided and the workpiece 2 and shaping electrode 3 are immersed therein. The electrode 3 is attached to one end of an elongated rod 6 and the other end of the rod 6 is connected to a piston of an oil pressure servo 7, which is provided for moving the electrode 3. The servo 7 also includes an oil pressure cylinder 8 and a valve 10, such as of the electromagnetic type which includes a coil 11. A potentiometer 12 having a reference power source 13 connected thereacross is connected through the coil 11 between the workpiece 2 and the shaping electrode 3. In the event that the gap voltage becomes greater than the reference voltage supplied through the potentiometer, the coil 11 will be energized and cause the electrode 3 to move towards the workpiece 2 by increasing the oil pressure of the cylinder 8, in the direction as shown by the solid arrows, and thereby move the elongated rod 6 towards the workpiece 2 until the desired constant gap size is reached. In a similar manner, the rod 6 will move the electrode 3 away from the workpiece 2 in the event that the shaping voltage falls below the reference voltage by increasing the oil pressure in a direction as shown by the dotted arrows.

The apparatus also includes an auxiliary elongated rod 15 which is parallel to the electrode moving rod 6. A movable contact plate 16 is connected to the auxiliary rod 15 and will move when subjected to a load greater than that of a given value. A limit switch LS, such as of the micro type, is attached to the contact plate 16 and is normally in an open condition (hereinafter referred to as open contact LSa). A contact making stem 17 is supported upon the movable rod 6 and forms a part of the limit switch LS.

The apparatus of the present embodiment further includes an AC power source 20 and a pulse generator 21 which push-button specific polarity square wave pulses. The positive output terminal of the generator 21 is connected to the electrode 3 and the negative output terminal thereof is connected to the workpiece 2. An electromagnetic contactor MC having normally open contacts MCa1 and MCa2, a time limit relay RT having a normally closed contact RTb for providing a delay operation and push-button switches Pb 1 and Pb 2 are additionally provided. push-button A detailed description of the operation of the apparatus of this embodiment of the invention will now follow. When the pushbutton switch Pb1 is closed, the electromagnetic contactor MC will cause the normally open contacts MCa1 and MCa2 to close. The contact MCa2 serves as a self-maintenance circuit for operating the electromagnetic contactor MC When the contact MCa1 is in a closed position, the AC electric power source 20 will supply power to the pulse generator 21 so that square wave pulses will be obtained at the output terminals thereof. The square wave pulses are then supplied between the working gap 4 to result in an electrical discharge therein. The power supply to the pulse generator 21 may be turned off by opening the push-button switch Pb2 or the contact RTb which will, in turn, open the contacts MCa1.

Figure 1:
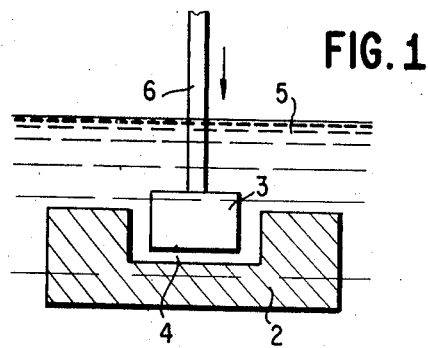
FIG. 1 shows a sectional view of a typical relationship between a shaping electrode and a workpiece in a normal electrical discharge shaping apparatus.
Figure 2:
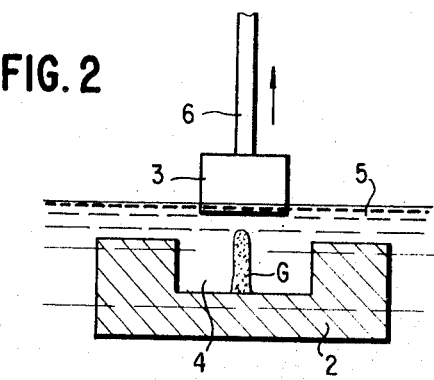
FIG. 2 shows a sectional view of a typical relationship between a shaping electrode and a workpiece under abnormal conditions, such as for deposit build-ups within the working gap, in an electrical discharge shaping apparatus.

Under a normal shaping operation, such as shown in FIG. 1, the electrode 3 will automatically move in a direction towards the workpiece 2 as the same is shaped. The desired movement of the electrode 3 will be provided by the oil pressure servo-mechanism 7. Under such normal conditions, the contact plate 16, shown in FIG. 3, will move in a downward direction with the contact closure stem 17 remaining in contact with the lower edge of the contact plate. However, in the event that adverse conditions occur and a deposit G, such as carbon, is accumulated within the shaping gap 4, as shown in FIG. 2, then the electrical discharge will occur between the deposit G and the electrode 3 and, in turn, the servo-mechanism 7 will operate to erroneously maintain constant the gap between the deposit G and the electrode 3, instead of the gap between the electrode 3 and the workpiece 2, so as to cause the electrode 3 to move in an upward direction as earlier described. As the electrode 3 is moved in an upward direction, the stem 17 will eventually make contact with the upper edge of the contact plate 16 and thereby close the limit switch LS and thus normally open contact LSa. The time limit relay RT will then begin to operate and if the limit switch LS remains closed for more than the set delay time of the relay RT, then the normally closed contact RTb of the relay RT will open and turn off the operation of the electromagnetic contactor MC. With the contactor MC turned off, the contacts MCa1 and MCa2 will be opened and the electric power being supplied to the pulse generator 21 will be turned off with the result that the electrical discharge within the gap will be stopped. It should be understood that the purpose of the delay in turning off the power is to allow for the possibility of the limit switch LS briefly being closed when transferring from a downward to an upward movement caused by a change in direction of the servo-mechanism 7.

It should now be apparent that with the present invention, the apparatus will shut down before a deposit G is accumulated, as shown in FIG. 2, to such an extent that an electrical discharge could occur near the surface of the shaping liquid and result in sparks in the air which could cause a fire to occur. Ordinarily, the electrical discharge shaping can safely be operated with a flammable liquid in that the electrical discharge will occur far away from the surface thereof and in the absence of air.

The embodiment shown and described with reference to FIG. 3 enables the detecting of an upward movement of the electrode 3 by the use of a mechanical limit switch. Obviously, the invention is not so limited. Thus, in FIG. 4, an alternative and preferred embodiment of the present invention shows circuitry for electrically detecting an upward movement of the electrode 3. Such circuitry by eliminating movement further increases the reliability of the apparatus.

Figure 4:
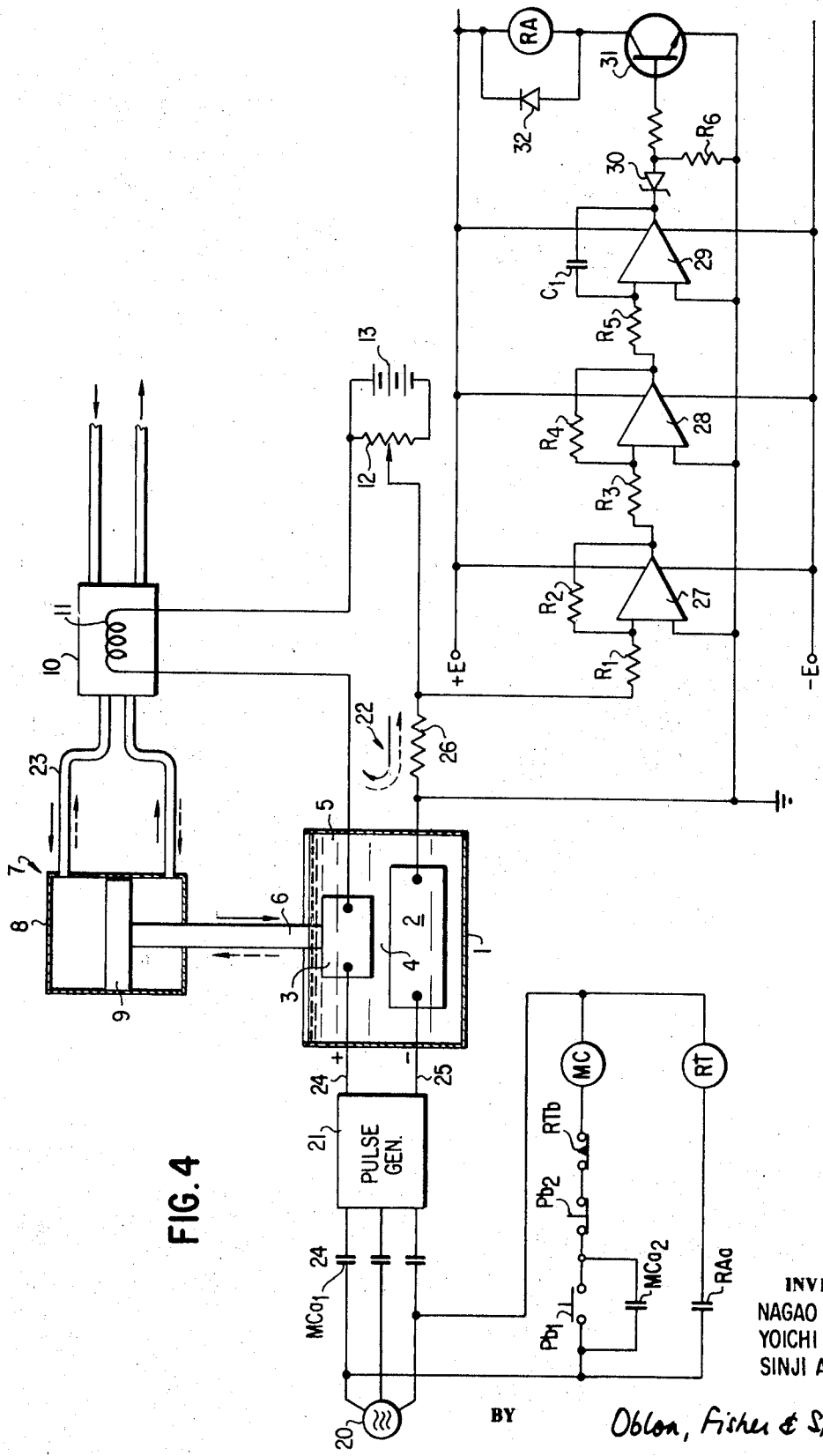
FIG. 4 shows a schematic block diagram of an alternative preferred embodiment of the electrical discharge shaping apparatus according to the present invention.

Referring now to FIG. 4, the electrical discharge shaping apparatus is shown as including similar to the embodiment of FIG. 3 the shaping tank 1, the workpiece 2 which is fixed within the tank 1, and the shaping electrode 3 for shaping the workpiece 2 through the working gap 4. The shaping liquid 5, such, for example, as kerosene, is provided and the workpiece 2 and electrode 3 are immersed therein. The electrode 3 is attached to one end of the elongated rod 6 and the other end of the rod 6 is connected to the piston of the oil pressure servo 7 which is provided for moving the electrode 3. The servo 7 also includes the oil pressure cylinder 8 and the valve 10, such as of the electromagnetic type which includes the coil 11. The potentiometer 12 having a reference power source 13 connected thereacross is connected through the coil 11 between the workpiece 2 and the shaping electrode 3. In the event that the gap voltage becomes greater than the reference voltage supplied through the potentiometer, the coil 11 will be energized in a direction shown by the arrow 22 and cause the electrode 3 to move towards the workpiece 2 by increasing the oil pressure of the cylinder 8 as shown by the solid arrow 23 and thereby move the rod 6 towards the workpiece 2 until the desired constant gap size is reached. In a similar manner, the elongated rod 6 will move the electrode 3 away from the workpiece in the event that the shaping voltage falls below the reference voltage by increasing the oil pressure in a direction as shown by the dotted arrows.

The apparatus of the embodiment of FIG. 4 also includes the three-phase AC power source 20 for supplying electric power to the pulse generator 21 upon closure of the normally open contact MCa1 of the electromagnetic contactor MC. The pulse generator 21 will supply square wave pulses at the positive terminal 24 thereof to the electrode 3 and will supply pulses to the workpiece 2 over the negative terminal 25.

The operation of the apparatus described above for shaping a workpiece by electrical discharge will now be described. When the push-button switch Pb1 is placed in the on position, the coil of the electromagnetic contactor MC will be excited and the normally opened contact MCa1 will be closed. The closing of the contacts MCa1 will enable the electric power from the source 20 to be supplied to the pulse generator 21 and simultaneously contact MCa2 will be closed and constitute the self maintenance circuit for the magnetic contactor MC after the switch Pb1 is opened. The apparatus of the present embodiment also includes the closed contact push-button switch Pb2 and the contact RTb of the closed contact time limit relay RT. A relay RA with an open contact RAa is provided and the same will allow the relay contact RTb to open after a specific time delay. The opening after the time delay of the relay contact RTb will stop pulses from being supplied to the working gap from the pulse generator 21. The stopping of pulses from being applied to the working gap may also be effected by placing the push-button switch Pb2 in the on position.

In the present embodiment, a resistor 26 is provided for enabling a voltage to be developed thereacross in an amount proportional to the electrical current flowing in the servo-coil 11. The voltage e across the resistor 26 is provided by the following formula:

$$e = iRo \quad (1)$$

wherein $iA$ is the electric current in the servo-coil 11 and $Ro$ is the resistance of the resistor 26. The polarity of the voltage $e$ across the resistor 26 will change in accordance with the direction of the electrode 3 and the magnitude thereof will change in accordance with the speed of movement of the electrode 3. When the electrode 3 approaches in a direction towards the workpiece 2, the electrical potential at the right hand side terminal point of the resistor 26 will be of a high value, while on the other hand, when the electrode 3 moves in a direction so as to recede from the workpiece 2, the electrical potential on the left hand terminal side of the resistor 26 will be of a high value.

Figure 5:
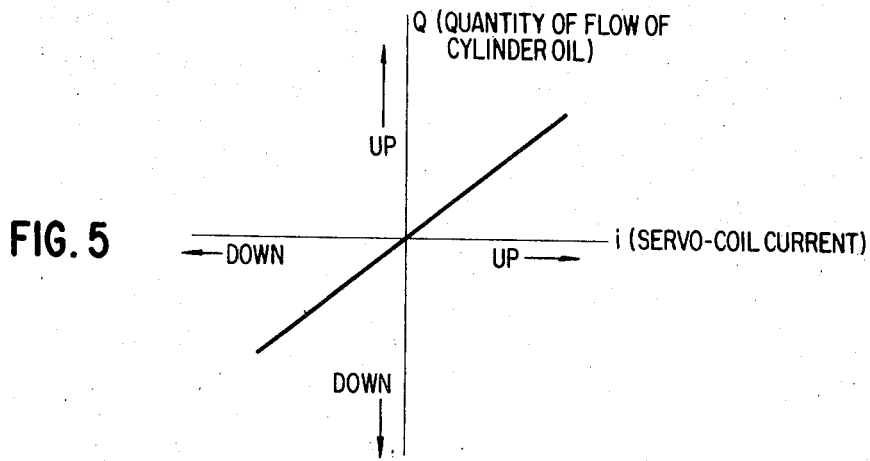
FIG. 5 is a characteristic curve which shows the quantity of flow of cylinder oil versus servo-coil current for the oil pressure servo-mechanism of the present invention.

Referring now to FIG. 5, the relationship between the amount of current passing through the servo-coil 11 to the quantity and direction of flow of oil passing to the cylinder portion 8 of the servo-mechanism 7 is therein graphically shown. In FIG. 5, the quadrant designated "up" corresponds to the case wherein the electrode 3 is receding from the workpiece 2 and the quadrant designated "down" refers to the case wherein the electrode 3 moves in a direction so as to approach the workpiece 2.

Figure 6:
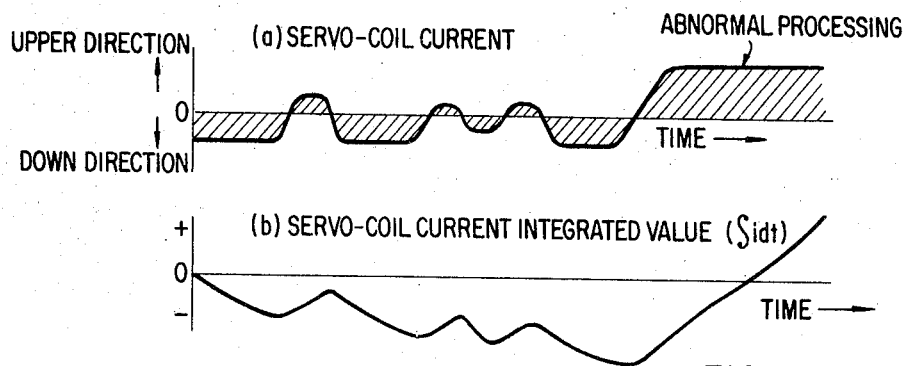
FIG. 6(a) is a characteristic curve showing the servo-coil current plotted against time.
FIG. 6(b) is a characteristic curve showing the integrated value of the servo-coil current plotted against time; and, FIG. 7 is a characteristic curve showing the output voltage plotted against the input voltage of an operational amplifier used in the embodiment shown in FIG. 4 of the present invention.

FIG. 6a graphically shows the servo-coil current versus time under various conditions during a shaping operation. For example, in a normal shaping operation, the average servo-coil current will be in a downward direction, even though at times the electrode 3 will briefly move in an upward direction. Under such normal shaping conditions, the electrode 3 will move in a direction towards the workpiece 2. However, when abnormal conditions are present and a deposit, such as carbon, accumulates within the working gap, the electrode will move in an upward direction away from the workpiece 2 and the servo-coil current will flow only in the upward direction as shown in that portion of FIG. 6a designated abnormal processing.

Referring now to FIG. 6b, the integrated value of the servo-coil current of FIG. 6a is shown as being plotted against time. From the Figure, it should be readily apparent that during a normal shaping operation, e.g., when the electrode is moving towards the workpiece 2, the integrated servo-coil current will be of a negative value as time proceeds, while during an abnormal shaping operation, the integrated value will eventually turn positive. The apparatus of the present invention utilizes the integrated value of the servo-coil current to detect a movement of the electrode 3 in a direction away from the workpiece 2 to allow the apparatus to be stopped at an appropriate time.

Figure 7:
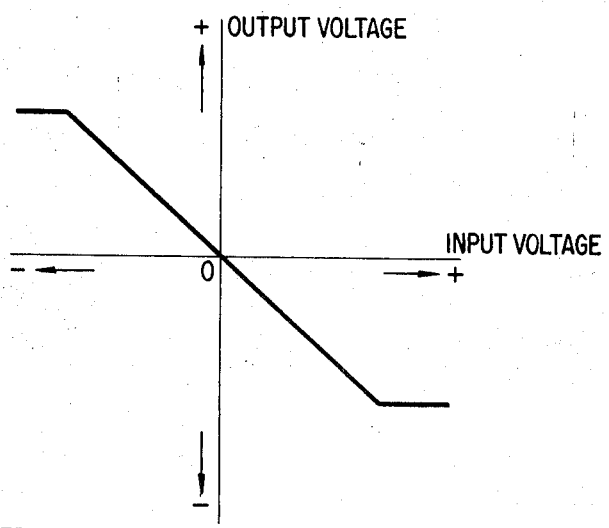

Referring again to FIG. 4, it should be again noted that the voltage e developed across the resistor 26 is of an amount proportional to the servo-coil current. In FIG. 4, a plurality of conventional operational amplifiers 27, 28, and 29 are provided and the same have the phase inversion transfer characteristics as shown in FIG. 7. The voltage e is applied to the operational amplifier 27, through a resistor $R_1$, and the output thereof which is designated as $e_{27}$ may be represented by the following formula:

$$e_{27} = -\frac{R_2}{R_1} e \quad (2)$$

The amount of amplification of the operational amplifier 27 is determined by the ratio of the feedback resistor $R_2$ to the resistor $R_1$. When abnormal conditions exist and the electrode 3 is moved in an upward direction away from the workpiece 2, the servo-coil current will flow in a direction as indicated by the dotted arrow 22 and as such the output voltage from the amplifier 27 will be of a negative value. In order to equalize the phase at the output of the amplifier 27 for enabling a signal suitable for later use, operational amplifier 28 for the purposes of inversion is supplied. The output voltage of the operational amplifier 28 is designated by $e_{28}$ and may be represented by the following formula:

$$e_{28} = -\frac{R_4}{R_3} e_{27} = \frac{R_4}{R_3} \cdot \frac{R_2}{R_1} \cdot e \quad (3)$$

An output operational amplifier 29 is provided for integrating the voltage at the output of operational amplifier 28, and the output thereof which is designated by $e_{29}$ may be represented by the following formula:

$$e_{29} = -\frac{1}{C_1 R_5} \int e_{28} \, dt$$

$$= -\frac{1}{C_1 R_5} \cdot \frac{R_4}{R_3} \cdot \frac{R_2}{R_1} \int e \, dt \quad (4)$$

The integrated value of the voltage $e$ across the resistor 26 will change, as shown in FIG. 6b, and as seen by the formula (4) will be of a positive value during an abnormal shaping operation, namely, when the electrode 3 is receding from the workpiece 2. A Zener diode 30 is provided and will normally be in a non-conductive state, such, for example, as when the output voltage of the integrating circuit 29 is of a low or negative value. However, when the voltage $e_{29}$ at the output of the integrating circuit 29 which is given by the formula (4) becomes of a positive value, then the Zener voltage will eventually be reached and the diode 30 will conduct. Upon conduction of the diode 30, the voltage thereacross will be dropped between a resistor $R_6$ and a resistor $R_7$ which is connected to the base of a normally non-conducting transistor 31. The transistor 31 which is normally non-conductive will conduct upon the application of a base current thereto through resistor $R_7$ upon conduction of the Zener diode 30. Upon conduction of the transistor 31, a collector current will be provided therefrom and the same will serve to excite the relay coil RA. A diode 32 is provided across the relay RA and serves to prevent the same from being actuated during the instant of time when the transistor 31 is changed from a conductive to a non-conductive state. The points is designated +E and −E are terminals to which a DC power source may be applied for operating the operational amplifiers 27, 28, and 29 and the transistor 31.

It should be understood that the integrating circuit 29 has enough delay to enable an abnormal upward transfer of the electrode 3 to be detected. However, in order to prevent the apparatus from responding to a normal upward transfer of the electrode 3, an additional delay is supplied to the apparatus through the use of a delay time limit relay RT which is excited after the relay coil RA. Upon excitation of the relay coil RA, the open contact RAa will close and the closed contact RTb will open, after the predetermined set delay. The contact MCa1 will, in turn, open, and the electric power being supplied to the pulse generator 21 will be turned off so that the operation of shaping by electrical discharge within the working gap area will be stopped.

It should be understood that during the period of delay of the delay time limit relay RT that the contact RAa should be closed. If, at any time, the contact RAa is opened, the delay operation of the relay RT will be stopped, and the period of delay before the shaping operation is stopped will have to begin again after the contact RAa is again closed. Accordingly, even though the electrode 3 moves in an upward position for a period of time such that the value integrated at the output of the integrating operational amplifier 29 is over the value needed to cause the Zener diode to conduct that if the upward transfer of the electrode 3 is stopped within a period of time less than that of the delay time of the relay RT that the downward movement of the electrode 3 will cause the contact RAa to open and allow for shaping operation to continue. Thus, with the present embodiment, the shaping operation will only be stopped if the electrode 3 moves in the upward condition for a given period of time such that an abnormal condition will clearly be detected.

Thus, with the present embodiment the provision of double delays by the integrating circuit 29 and the time limit relay circuit RA enables the apparatus to respond to only a continuous abnormal upward transfer of the electrode 3 which could be caused by a deposit accumulation, such as carbon, but will not allow the apparatus to respond to an upward transfer of the electrode 3 which is merely caused by a sudden short between the electrode 3 and the workpiece 2 or an intermittent upward transfer of the electrode 3 which may be caused during the supplying of the shaping liquid within the working gap.

It should now be apparent that with the present embodiment fires which may be caused by an electrical discharge near the surface of a shaping liquid may be readily avoided by allowing the apparatus to automatically be stopped upon the detection of an abnormal accumulation of a deposit of carbon or the like within the shaping area.

Obviously, many modifications and variations of the present invention are possible in light of the above teachings. For example, the time constant of the integrating circuit 29 can be adjusted so as to provide a delay of about 1,000 seconds and by such provisions, the time limit relay can be eliminated. It is therefore to be understood that within the scope of the teachings herein and the appended claims, the invention may be practiced otherwise than as specifically described.

What is claimed and desired to be secured by letters patent of the United States is:

1. An apparatus for shaping a workpiece immersed within a liquid containing tank by electrical discharge comprising:
   a shaping electrode placed within said tank and positioned opposite to said workpiece so as to provide a gap between said electrode and said workpiece;
   means for supplying a source of electrical power to said gap during the shaping of said workpiece;
   means for maintaining said gap at a constant value as the shaping operation proceeds; and,
   means for detecting when an abnormal condition exists during said shaping operation and for stopping the same, said means for detecting and stopping including switching means operative in response to a movement of said electrode of a given distance for a predetermined period of time in a direction opposite to the normal shaping direction of said electrode.

2. An apparatus for shaping a workpiece as in claim 1, wherein said switching means is of the micro-switch type and includes a contact closure stem coupled to said electrode and movable therewith such that said stem will make contact with the contact closure portion of an adjoining plate of said switching means upon said movement of said electrode of a given distance in a direction opposite to the normal shaping direction of said electrode.

3. An apparatus for shaping a workpiece as in claim 2, wherein said predetermined period of time is determined by a delay relay which is provided and actuated upon operation of said switching means whereby said relay will delay the stopping of said shaping operation for a predetermined period of time after which time said operation will be stopped by preventing said source of electrical power from being applied to said gap.

4. An apparatus for shaping a workpiece immersed within a liquid containing tank by electrical discharge comprising:
   a shaping electrode placed within said tank and positioned opposite to said workpiece so as to provide a gap between said electrode and said workpiece;
   means for supplying a source of electrical power to said gap during the shaping of said workpiece;
   means for maintaining said gap at a constant value as the shaping operation proceeds, said means for maintaining said gap at a constant value being an oil pressure servo-mechanism; and,
   means for detecting when an abnormal condition exists during said shaping operation and for stopping the same, said means for detecting and stopping including means for integrating the value of time fluctuations of current in a valve coil of said servo-mechanism and wherein upon said integrated value being of a given polarity in value for a predetermined time, said abnormal condition will be indicated and the source of electrical power being supplied to said gap will be turned off.

5. An apparatus for shaping a workpiece as in claim 4, wherein said means for integrating includes an operational amplifier.

6. An apparatus for shaping a workpiece as in claim 5, wherein the output of said operational amplifier is connected to a semiconductive switch which enables a relay to be energized upon conduction of said switch, said conduction being caused by movement of said electrode in a direction opposite to that of said shaping operation and wherein if said upward movement of said electrode continues for a predetermined delay time provided by said relay, an abnormal condition will be indicated and said shaping operation stopped.

7. An apparatus for shaping a workpiece as in claim 6, wherein said semiconductive switch is a Zener diode.

* * * * *